(12) United States Patent
Mashita et al.

(10) Patent No.: US 11,720,323 B2
(45) Date of Patent: Aug. 8, 2023

(54) AUDIO DEVICE, PROGRAM, AND PLAYBACK CONTROL METHOD

(71) Applicant: AlphaTheta Corporation, Yokohama (JP)

(72) Inventors: Takashi Mashita, Yokohama (JP); Shintaro Kido, Yokohama (JP); Masayuki Mikasa, Yokohama (JP); Masamichi Tomii, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 0 days.

(21) Appl. No.: 17/909,018

(22) PCT Filed: Mar. 3, 2020

(86) PCT No.: PCT/JP2020/008934
§ 371 (c)(1),
(2) Date: Sep. 2, 2022

(87) PCT Pub. No.: WO2021/176562
PCT Pub. Date: Sep. 10, 2021

(65) Prior Publication Data
US 2023/0087318 A1 Mar. 23, 2023

(51) Int. Cl.
*G06F 3/16* (2006.01)
*G06F 3/0481* (2022.01)
*G06F 3/04847* (2022.01)

(52) U.S. Cl.
CPC ............ *G06F 3/165* (2013.01); *G06F 3/0481* (2013.01); *G06F 3/04847* (2013.01); *G10H 2220/116* (2013.01)

(58) Field of Classification Search
CPC .... G06F 3/165; G06F 3/0481; G06F 3/04847; G10H 2250/615; G10H 2220/005;
(Continued)

(56) References Cited

U.S. PATENT DOCUMENTS

2011/0029867 A1   2/2011   Park

OTHER PUBLICATIONS

English translation of the International Preliminary Report on Patentability dated Sep. 6, 2022 issued in the corresponding International application No. PCT/JP2020/008934 (5 pages).
(Continued)

*Primary Examiner* — Haoshian Shih
(74) *Attorney, Agent, or Firm* — Rankin, Hill & Clark LLP

(57) ABSTRACT

An audio device being a mobile terminal includes: first and second playback units; and a display controller that causes a display to display a screen including an operation element for accepting a user operation. The display controller includes: a first display controller to display a first screen including an operation element for the first music data; a second display controller to display a second screen including an operation element for the second music data; a third display controller to display a third screen including a third operation element including one of an operation element for both the first and second music data or an operation element for adjusting an audio output ratio, the third screen not including an operation element related to the playback setting; and a display transition controller to display the first-third screens so as to make transition between the first-third screens based on the user operation.

9 Claims, 12 Drawing Sheets

(58) Field of Classification Search
CPC ....... G10H 2220/116; G10H 2250/641; G10H 2210/241
See application file for complete search history.

(56) References Cited

OTHER PUBLICATIONS

International Search Report dated Aug. 4, 2020, Application No. PCT/JP2020/008934; English translation included, 4 pages.
"DJ Player Professional", Website introducing an application, (available from iMect Ltd.), https://apps.apple.com/jp/app/dj-playerprofessional/id339810085; discussed in the specification.

AUDIO DEVICE, PROGRAM, AND PLAYBACK CONTROL METHOD

TECHNICAL FIELD

The present invention relates to an audio device, a program, and a playback control method.

BACKGROUND ART

In a case where a disc jockey (DJ) performs DJ performance by operating, for example, a playback control device such as a DJ controller, or a computer, it is necessary to perform a preliminary work called "preparation work" in advance. The preparation work includes, without limitation, selection of music, analysis of music data (e.g., detection of BPM and the key, detection of a beat position, adjustment, setting of a cue point), and compatibility check between multiple pieces of music. In a case of performing such a preparation work on a computer, the computer displays pieces of information of multiple players in parallel and a user performs the preparation work for each player and the preparation work for each piece of music.

In the DJ performance, new music and new performance are constantly desired, and DJ is constantly looking for new music and a new playing method. Accordingly, there are a great number of demands for a preparation work using a mobile terminal such as a smartphone or a tablet terminal instead of a computer, as a method that is easily executable without any restrictions on a place at which the work is to be performed. Thus, for example, Non-Patent Literature 1 discloses an application that makes the preparation work executable by a computer or by a mobile terminal.

CITATION LIST

Non-Patent Literature

Non-Patent Literature 1: Website introducing an application, DJ Player Professional (available from iMect Ltd.) (https://apps.apple.com/jp/app/dj-player-professional/id339810085)

SUMMARY OF THE INVENTION

Problems to be Solved by the Invention

However, a mobile terminal has restrictions on a size of a display screen as compared with a computer. A preparation work covers a wide variety of works as described above. Thus, in order to perform the preparation work on the mobile terminal in a manner similar to a way the computer performs the preparation work, the following measures may be considered, for example: an amount of information to be displayed on the display screen may be reduced; and a size of an object such as an operation element may be reduced. However, such measures deteriorates operability and visibility.

Accordingly, an object of the invention is to provide an audio device, a program, and a playback control method which make it possible for the audio device being a mobile terminal to achieve high operability and high visibility in performing a preparation work.

Means for Solving the Problems

According to an aspect of the invention, an audio device includes: a first playback unit that plays back first music data; a second playback unit that plays back second music data; and a display controller configured to cause a display to display a screen, the screen including an operation element for accepting a user operation related to at least one of playback setting or playback control with respect to at least one of the first music data or the second music data, in which the playback setting includes setting of a playback position in music data to be set, the display controller includes: a first display controller configured to cause the display to display a first screen, the first screen including a first operation element related to the playback setting and the playback control with respect to the first music data; a second display controller configured to cause the display to display a second screen, the second screen including a second operation element related to the playback setting and the playback control with respect to the second music data; a third display controller configured to cause the display to display a third screen, the third screen including a third operation element including at least one of an operation element related to the playback control with respect to both the first music data and the second music data or an operation element for adjusting an output level ratio between the first music data and the second music data, the third screen not including an operation element related to the playback setting; and a display transition controller configured to cause the display to display the first screen, the second screen, and the third screen in a manner as to make transition between the first screen, the second screen, and the third screen on a basis of the user operation, and the audio device is a mobile terminal.

According to another aspect of the invention, a program configured to cause a computer to operate as the audio device according to the above aspect of the invention is provided.

According to a still another aspect of the invention, a playback control method to be executed by an audio device, the audio device including a first playback unit configured to play back first music data, a second playback unit configured to play back second music data, and a display controller configured to cause a display to display a screen, the screen including an operation element for accepting a user operation related to at least one of playback setting or playback control with respect to at least one of the first music data or the second music data, the playback setting including setting of a playback position in music data to be set, the audio device being a mobile terminal, the playback control method includes: accepting the user operation, and causing the display to display a first screen, a second screen, and a third screen in a manner as to make transition between the first screen, the second screen, and the third screen on a basis of the user operation, the first screen including a first operation element related to the playback setting and the playback control with respect to the first music data, the second screen including a second operation element related to the playback setting and the playback control with respect to the second music data, the third screen including a third operation element including at least one of an operation element related to the playback control with respect to both the first music data and the second music data or an operation element for adjusting an audio output ratio between the first music data and the second music data, the third screen not including an operation element related to the playback setting.

DESCRIPTION OF EMBODIMENT(S)

The following describes preferred exemplary embodiments of the invention in detail with reference to the accompanying drawings. It is to be noted that, in this description and the accompanying drawings, components that have substantially the same functional configuration are indicated by the same reference signs, and thus redundant description thereof is omitted.

Figure 1:
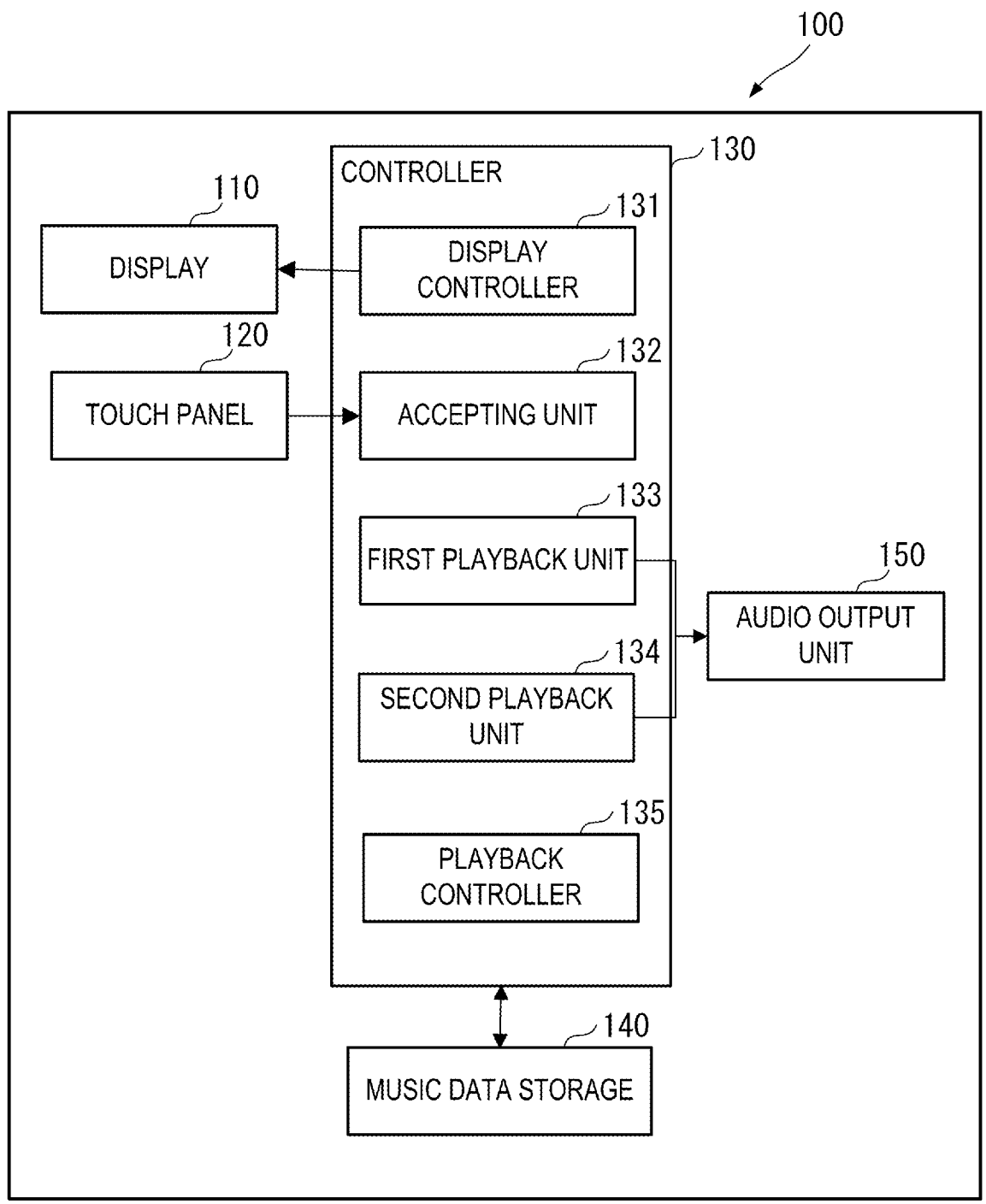
FIG. 1 is a block diagram illustrating a schematic functional configuration of an audio device according to an exemplary embodiment of the invention.

FIG. 1 is a block diagram illustrating a schematic functional configuration of an audio device according to an exemplary embodiment of the invention. The audio device according to an exemplary embodiment of the invention is an audio device being a mobile terminal such as a smartphone or a tablet. Hereinafter, a smartphone will be described as an example of the mobile terminal. An audio device 100 includes: a function of a first player (hereinafter, referred to as "player A") that plays back first music data and a second player (hereinafter, referred to as "player B") that plays back second music data; and a function of a mixer that controls both the player A and the player B.

As illustrated in FIG. 1 the audio device 100 includes a display 110, a touch panel 120, a controller 130, a music data storage 140, and an audio output unit 150. Respective functions of the above-described components are achieved by, for example, a processor operating in accordance with a program, in an audio device having a hardware configuration of a computer. Hereinafter, the respective functions of the components will be further described.

The display 110 is a display device that displays a screen including various types of information in the audio device 100 and an operation element for accepting a user operation. As the display 110, a display device of any type is employable such as a liquid crystal display device or an organic EL display device.

The touch panel 120 is provided on a surface of the display 110. The touch panel 120 detects a contact position where a user touches and outputs information such as coordinates indicating the contact position to the controller 130. As the touch panel 120, a touch panel of any type is employable such as an electrostatic capacity type or resistive film type.

The controller 130 is implemented in the audio device 100 by means of, for example, a communication interface, a processor such as a central processing unit (CPU), and a memory to be a work area, and controls operation of the audio device 100. The controller 130 includes a display controller 131, an accepting unit 132, a first playback unit 133, a second playback unit 134, and a playback controller 135 which are achievable by a processor operating in accordance with a program stored in a memory or received via a communication interface.

The display controller 131 causes the display 110 to display a screen that includes: information of music data to be played back by the audio device 100; and a display element (hereinafter, also referred to as "operation element") of a graphical user interface (GUI) for accepting the user operation related to playback setting and playback control with respect to the music data.

The accepting unit 132 accepts the user operation on the basis of the contact position where the user touches detected by the touch panel 120. Subsequently, the accepting unit 132 supplies information indicating content of the user operation to each component in the controller 130.

The first playback unit 133 performs playback of music data by the player A serving as the first player. The second playback unit 134 performs playback of music data by the player B serving as the second player. The first playback unit 133 and the second playback unit 134 each output an audio signal to the audio output unit 150, which will be described later.

The playback controller 135 acquires music data from the music data storage 140, which will be described later, on the basis of the user operation via the touch panel 120 and the accepting unit 132, and performs playback control of the acquired music data by controlling the first playback unit 133 and the second playback unit 134.

The music data storage 140 is configured to store music data by means of, for example, a hard disk drive (HDD) or a flash memory. The music data storage 140 stores multiple pieces of music data in a predetermined format such as an MP3 format. In addition to audio information, the music data includes, as tag information, information of BPM, an artwork, a title, a name of an artist, a name of an album, a key, the number of times played by DJ, and a genre, of the music. The music data to be stored in the music data storage 140 is associated with a time stamp which is information of a playback position.

The audio device 100 may include a communication interface, may acquire music data stored in, for example, an external storage device and a computer, via an unillustrated communication interface, and may store the music data in the music data storage 140. In this case, the audio device 100 does not include the music data storage 140, and the external storage device operates as the music data storage 140.

The audio output unit 150 includes, for example, a speaker and a headphone terminal, and outputs the respective audio signals of the music data played back by the first playback unit 133 and the music data played back by the second playback unit 134 as the audio information.

A description is given of a display screen on the display 110 of the above-described audio device 100 which is to be displayed when the user performs a preparation work.

Figure 2:
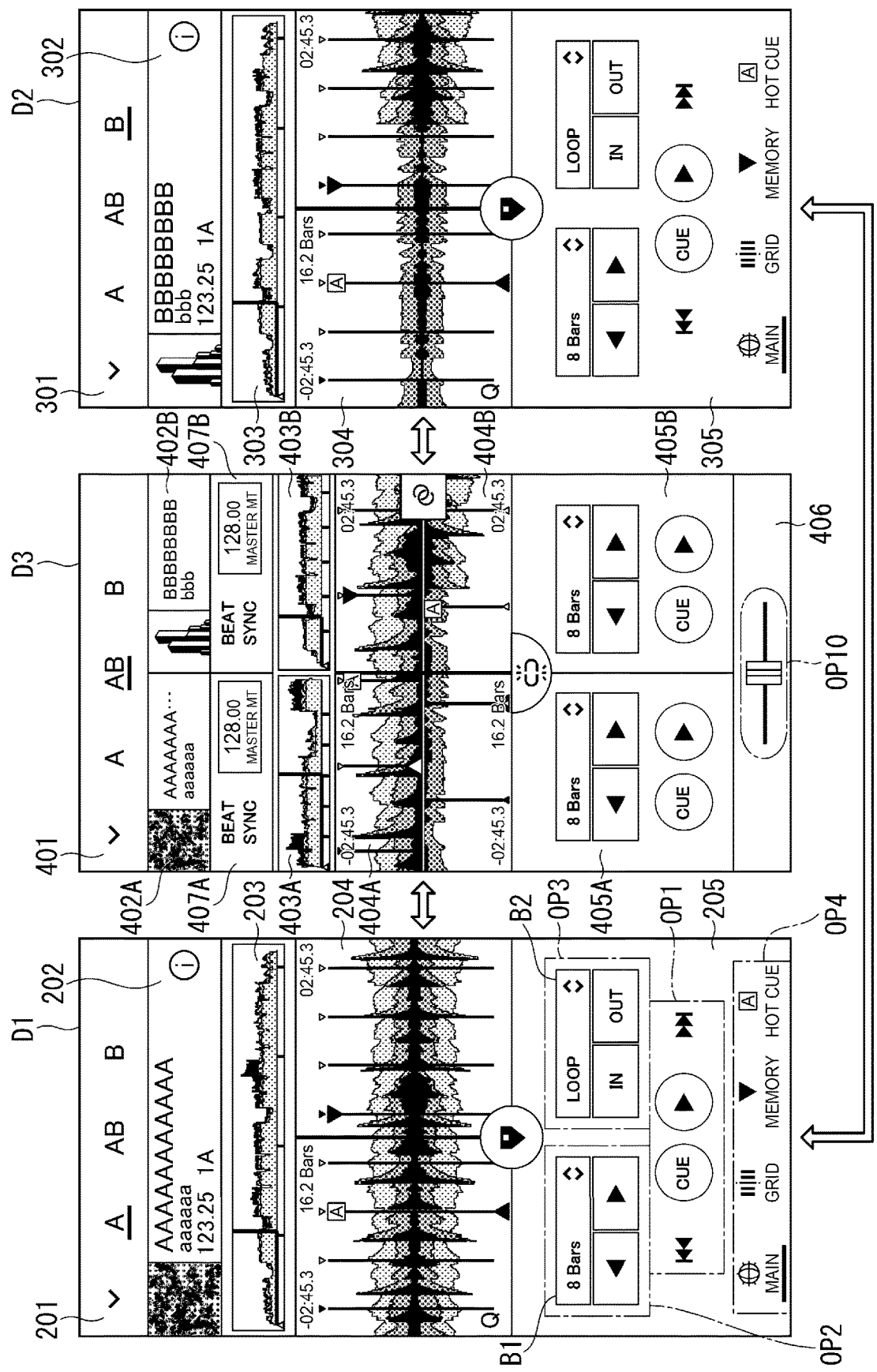
FIG. 2 is a diagram illustrating an example of a display screen according to an exemplary embodiment of the invention.

FIGS. 2 to 7 are each a diagram illustrating an example of a display screen according to the present exemplary embodiment. As illustrated in FIG. 2, the display controller 131 displays, on the display 110, one of: a player screen D1 that is a first screen for performing playback setting and playback control related to the player A; a player screen D2 that is a second screen for performing playback setting and playback control related to the player B; and a mixer screen D3 that is a third screen for performing playback control on both the first music data in the player A and the second music data in the player B.

In FIG. 2, a display area 201 is provided in an upper part of the player screen D1. The display area 201 displays data indicating the player currently being selected. Specifically, the display area 201 displays: a text display of "A" indicating the player A, a text display of "B" indicating the player B, and a text display of "AB" indicating the mixer; and an underline indicating which one is being selected. The user is able to check the player that is being selected by visually checking which one of "A", "B" and "AB" is underlined.

A display area 202 is provided below the display area 201. The display area 202 indicates information of music data loaded in the player A. The display area 202 displays, for example, a title, a name of an artist, and a thumbnail related to music, of the music data.

A display area 203 is provided below the display area 202. The display area 203 displays waveform information of the entire music data loaded in the player A.

A display area 204 is provided below the display area 203. The display area 204 displays partial waveform information of the music data loaded in the player A. It is to be noted that the partial waveform information is obtained by enlarging waveform information within a predetermined time period including a current playback position, out of the waveform information of the music data.

A display area 205 is provided below the display area 204. The display area 205 displays operation elements for accepting the user operation to be performed on the music data loaded in the player A.

As illustrated in FIG. 2, the display area 205 includes, as operation elements related to the playback control in the player A: an operation element OP1 related to basic playback control; an operation element OP2 related to an operation of skipping the playback position; and an operation element OP3 related to playback repetition. The display area 205 further includes, as an operation element related to the playback setting in the player A, an operation element OP4 for selecting a kind of the playback setting.

The operation element OP1 includes, for example, a play or pause button, a track search button, and a CUE button which are related to the player A. It is to be noted that, in addition to or instead of the track search button, a search button may be included. The operation element OP1 may also include a button that operates as both the track search button and the search button in response to content of the user operation (for example, a long pressing operation in which a selecting action continues for a predetermined time period or longer).

Figure 3:
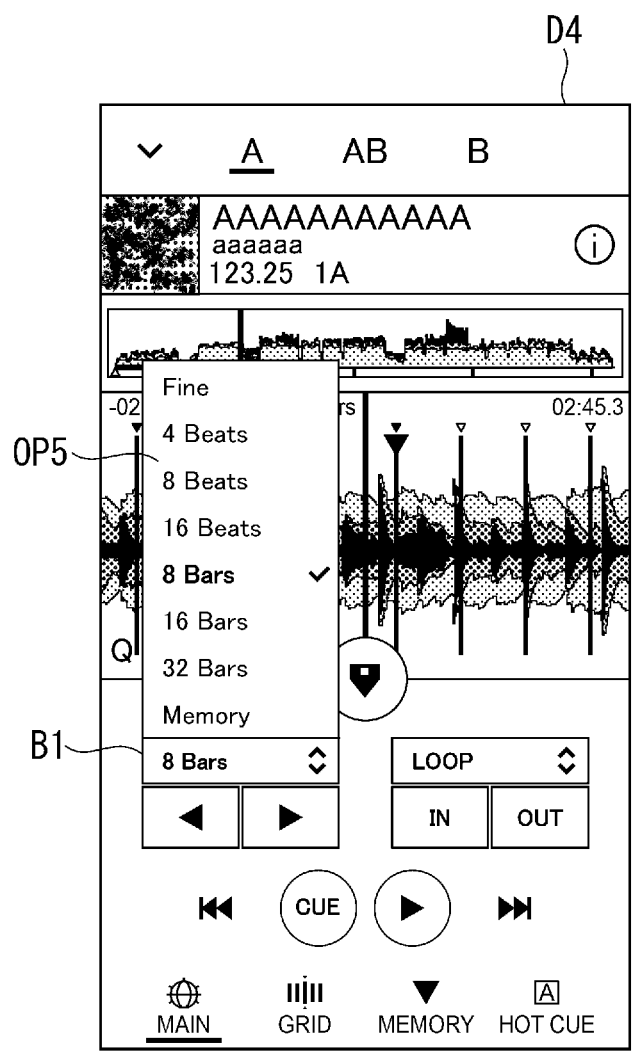
FIG. 3 is a diagram illustrating another example of the display screen according to an exemplary embodiment of the invention.

The operation element OP2 includes, for example, a button for skipping the playback position in a fast forward direction or in a rewind direction while performing playback of the player A, and a selection box B1 for selecting a skip interval. It is to be noted that, in a case where the user operation of selecting the selection box B1 is performed, a player screen D4 illustrated in FIG. 3 is displayed on the display 110. As illustrated in FIG. 3, the player screen D4 includes an operation element OP5 including a list of specifiable skip intervals in addition to the above-described operation element OP2. It is to be noted that portions of the player screen D4 other than the operation element OP5 is similar to those of the player screen D1. In the following descriptions of FIGS. 4 to 7, only portions differing from those of the player screen D1 will be described, and descriptions of portions similar to those of the player screen D1 will be omitted.

Figure 4:
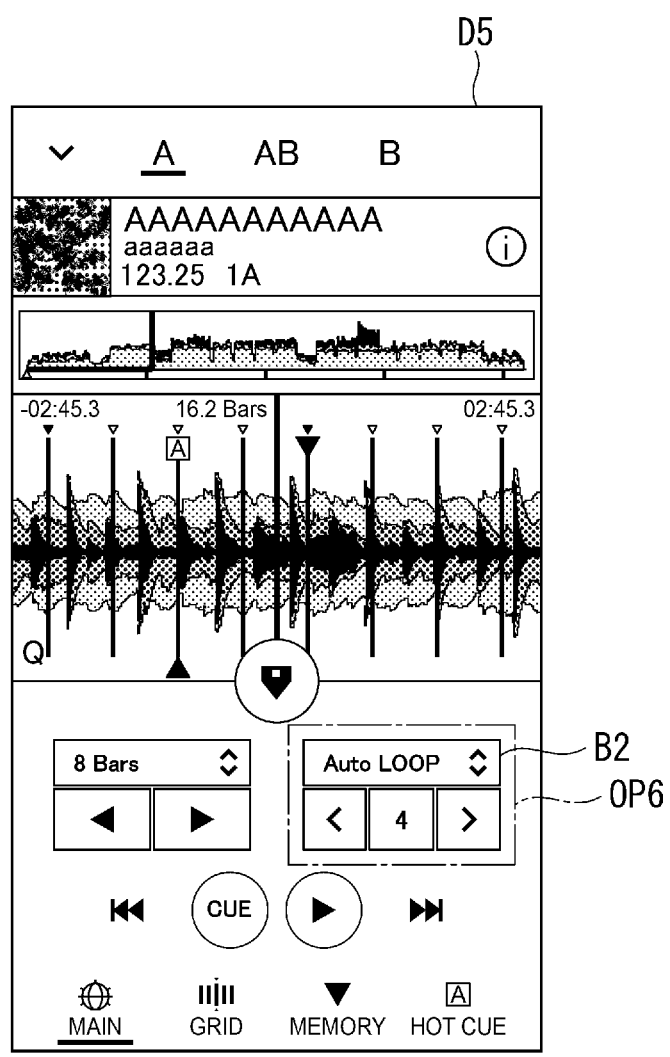
FIG. 4 is a diagram illustrating another example of the display screen according to an exemplary embodiment of the invention.

The operation element OP3 includes, for example, as operation elements for performing setting related to the playback repetition of a portion of the music data to be set: a selection box B2 for selecting one of a manual mode for manually specifying a start point and an end point or an automatic mode for specifying the start point and a repeating section; and an IN button and an OUT button for specifying the start point and the end point of the playback repetition in the manual mode. It is to be noted that, when the user operation of selecting the selection box B2 is performed and the automatic mode is selected, the display 110 displays a player screen D5 illustrated in FIG. 4. As illustrated in FIG. 4, the player screen D5 includes an operation element OP6 instead of operation element OP3 described above. The operation element OP6 includes, for example, the selection box B2 described above, a button for specifying the start point of the playback repetition in the automatic mode, and a button for specifying the repeating section.

The operation element OP4 includes, as operation elements for selecting a kind of the playback setting: a MAIN button for calling a HOME screen; a GRID button for performing setting of beat position information; a MEMORY button for performing setting of MEMORY CUE; and a HOT CUE button for performing setting of HOT CUE. When the user operation of selecting the MAIN button is performed, the display 110 displays the above-described player screen D1 as the HOME screen.

Figure 5:
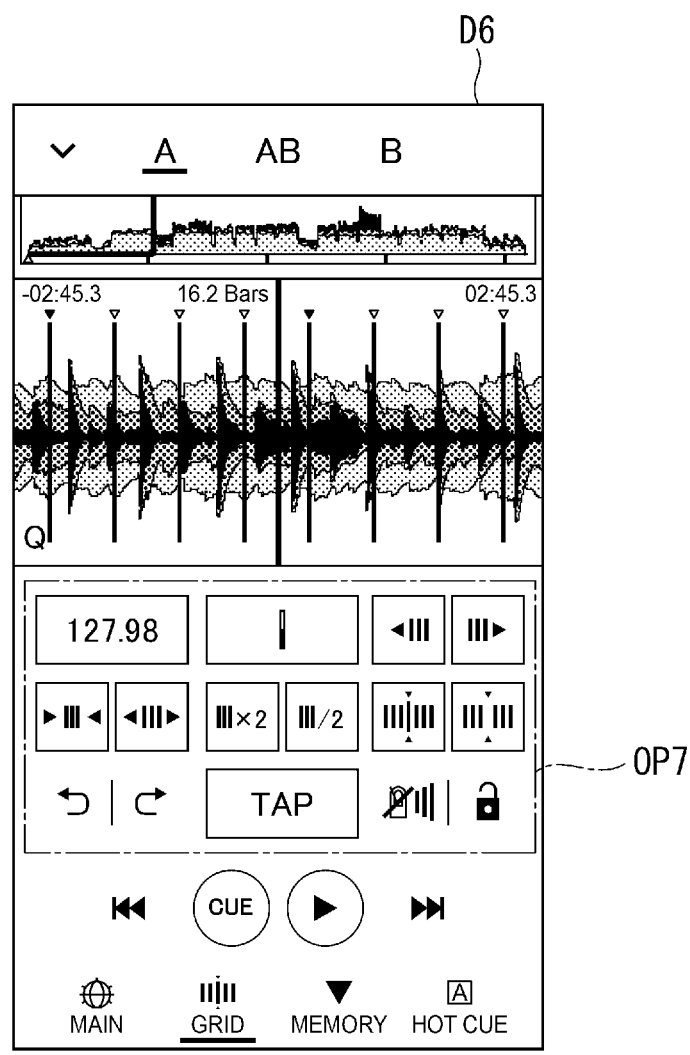
FIG. 5 is a diagram illustrating another example of the display screen according to an exemplary embodiment of the invention.

When the user operation of selecting the GRID button is performed, the display 110 displays a player screen D6 illustrated in FIG. 5. As illustrated in FIG. 5, the player screen D6 includes an operation element OP7 instead of the operation elements OP2 and OP3 of the player screen D1 described above. The operation element OP7 includes, for example, buttons for adjusting a position and a width of GRID related to the music data to be set. In the example of FIG. 5, upon displaying the operation element OP7, the display of the display area 202 is omitted in which the title, the name of the artist, and the thumbnail related to music, of the music data are displayed. The same applies to FIGS. 6 and 7, which will be described later.

Figure 6:
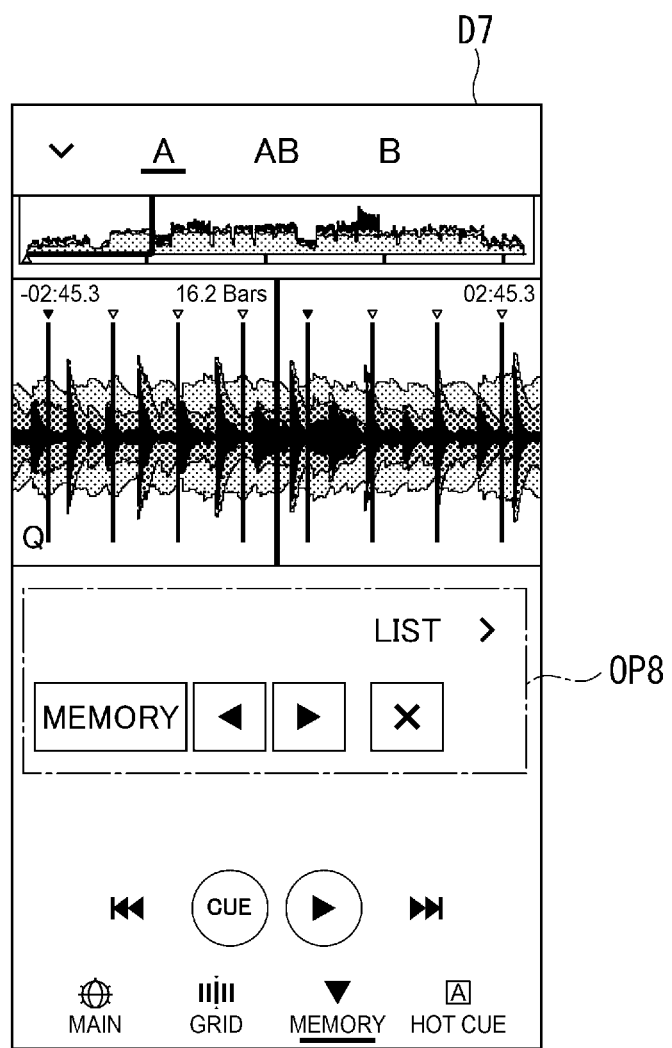
FIG. 6 is a diagram illustrating another example of the display screen according to an exemplary embodiment of the invention.

MEMORY CUE is playback setting for performing, with respect to the music data to be set, playback waiting of the music data at a specified playback position. When the user operation of selecting the MEMORY button is performed, the display 110 displays a player screen D7 illustrated in FIG. 6. As illustrated in FIG. 6, the player screen D7 includes an operation element OP8 instead of the operation elements OP2 and OP3 of the player screen D1 described above. The operation element OP8 includes, for example, a button for adding or deleting MEMORY CUE, a button for calling MEMORY CUE, and a button for setting and calling detailed information of MEMORY CUE. It is to be noted that, upon setting MEMORY CUE, the playback position may be decided on the basis of the above-described beat position information.

Figure 7:
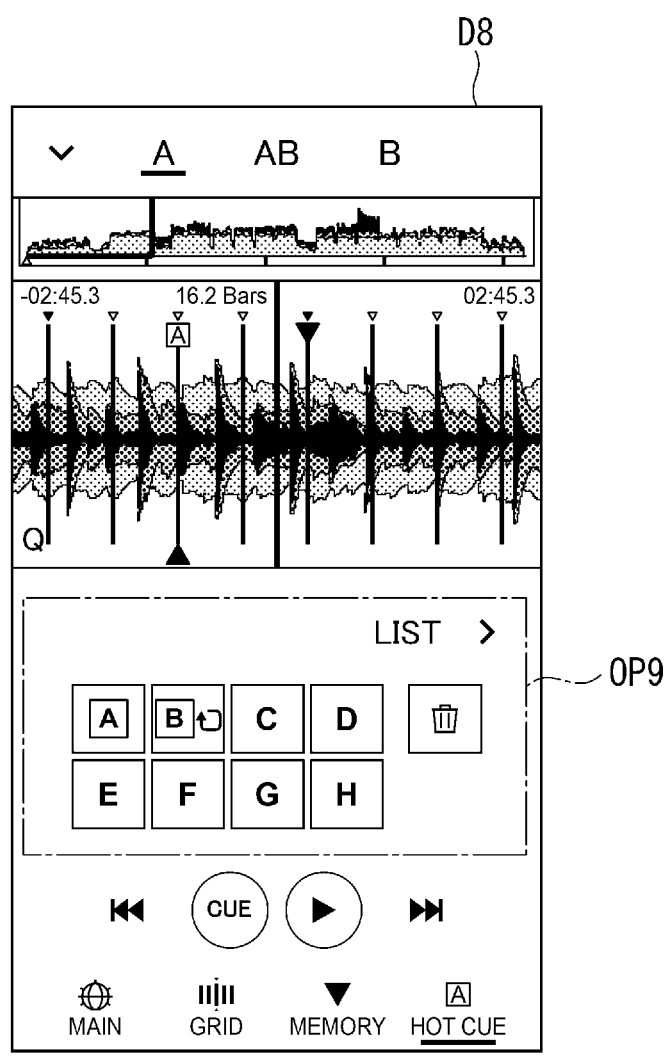
FIG. 7 is a diagram illustrating another example of the display screen according to an exemplary embodiment of the invention.

HOT CUE is playback setting for performing, with respect to the music data to be set, playback start of the music data from the specified playback position. When the user operation of selecting the HOT CUE button is performed, the display 110 displays a player screen D8 illustrated in FIG. 7. As illustrated in FIG. 7, the player screen D8 includes an operation element OP9. The operation element OP9 includes, for example, a button for adding or deleting HOT CUE, a button for calling HOT CUE, and a button for setting and calling detailed information of HOT CUE. It is to be noted that, also upon setting HOT CUE, the playback position may be decided on the basis of the above-described beat position information.

As described above, the player screens D1 and D4 to D8 are each the first screen for performing the playback setting and the playback control related to the player A, and the operation elements OP1 to OP9 are each the first operation element included in the first screen. The user causes the display 110 to display the first screen by operating the touch panel 120, and is thereby able to perform, for example, the playback setting and the playback control with respect to the first music data of the player A.

Referring back to FIG. 2, the player screen D2 for performing the playback setting and the playback control related to the player B will be described. As illustrated in FIG. 2, the player screen D2 is provided with display areas 301 to 305 including operation elements related to music data loaded in the player B. The display areas are each similar to corresponding one of the display areas of the player screen D1 described above. Thus, the description thereof is omitted. Further, operation elements included in the display area 305 are each similar to corresponding one of the operation elements described for the player screens D1 and D4 to D8. Thus, the description thereof is also omitted.

The player screen D2, and unillustrated display screens respectively corresponding to the player screens D4 to D8 are each the second screen for performing the playback setting and the playback control related to the player B, and operation elements respectively corresponding to the operation elements OP1 to OP9 are each the second operation element included in the second screen. The user causes the display 110 to display the second screen by operating the touch panel 120, and is thereby able to perform, for example, the playback setting and the playback control with respect to the second music data of the player B.

Next, the mixer screen D3 for performing the playback control related to both the player A and the player B will be described. As illustrated in FIG. 2, the mixer screen D3 basically has a configuration in which the above-described player screen D1 related to the player A and the above-described player screen D2 related to the player B are displayed in parallel in a horizontal direction. Of display areas 401 to 406 of the mixer screen D3, the display area 401 is similar to each of the respective corresponding display areas of the player screens D1 and D2.

The display areas 402A and 402B are obtained by displaying the respective corresponding display areas of the player screens D1 and D2 in parallel in the horizontal direction. Display areas 407A and 407B display, for example: information indicating BPM of the player A and information indicating BPM of the player B, respectively; and information indicating a so-called BEAT SYNC state which is a state in which BPM of the player A and BPM of the player B are automatically synchronized. The display areas 403A and 403B are obtained by displaying the respective corresponding display areas of the player screens D1 and D2 in parallel in the horizontal direction.

The display areas 404A and 404B are obtained by displaying, in parallel in a vertical direction, a top half of the waveform information of the corresponding display area 204 of the player screen D1 and a bottom half of the waveform information of the corresponding display area 304 of the player screen D2. The display areas 405A and 405B are obtained by displaying respective portions of the display area 205 of the player screen D1 and the display area 305 of D2 in parallel in the horizontal direction. Here, the display areas 405A and 405B each display respective portions of the operation element OP1 related to the basic playback control and the operation element OP2 related to the operation of skipping the playback position that are displayed in the respective display areas described above, but do not display the operation element OP3 related to the playback repetition and the operation element OP4 for selecting the kind of playback setting.

The display area 406 includes an operation element OP10 including a cross fader for adjusting an output level ratio between the music data to be outputted from the player A and the music data to be outputted from the player B.

The mixer screen D3 as described above is the third screen including a third operation element related to the playback control with respect to both the first music data of the player A and the second music data of the player B, i.e., mixing of the first music data of the player A and the second music data of the player B. The user causes the display 110 to display the third screen by operating the touch panel 120, and is thereby able to perform the playback control related to the mixer such as playback control common to both the first music data of the player A and the second music data of the player B, and the compatibility check between the first music data and the second music data.

As described above, the audio device 100 is provided with multiple display screens for each player in accordance with a purpose of the preparation work. Specifically, for example, the user performs: operation of the playback repetition and operation of the playback setting such as the setting of GRID, the setting of MEMORY CUE, and the setting of HOT CUE on the display of each of the player screens D1 and D2; and the compatibility check of a case of playing back the first music data and the second music data on the display of the mixer screen D3.

Next, operation of each component upon changing the players to be set and to be displayed will be described. In a case of changing the players, the user performs a so-called flick operation, in which the user slides his/her finger in a horizontal direction at any position on the display 110, and is thereby able to change the selected player. At this time, a relationship of a direction in which the flick operation is performed versus each display screen depends on a positional relationship between the two players disposed on both sides of the mixer. Thus, the user is able to perform the preparation work even on the audio device 100 being the mobile terminal, in a manner similar to a case of performing the preparation work on an actual DJ device.

It is to be noted that the user is also able to change the selected player by selecting any one of the text information of "A", "B" and "AB" described in the display areas 201, 301, and 401 of the player screens D1 to D3 in FIG. 2. However, in a case where the user holds the audio device 100 with one hand, it is difficult to handle an upper portion of the display screen, and therefore, the flick operation described above has higher operability.

Figure 8:
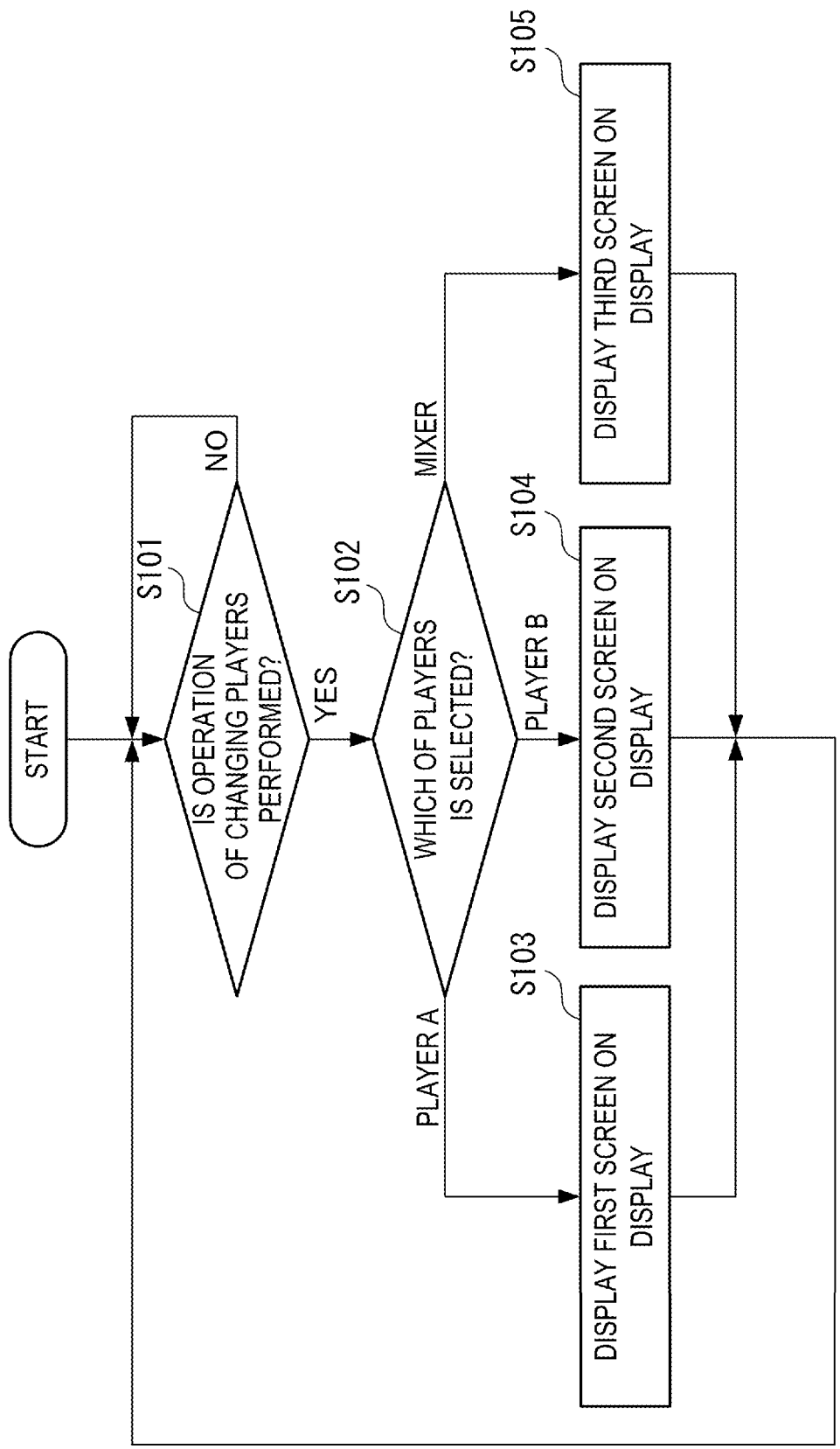
FIG. 8 is a flowchart illustrating a playback control method according to an exemplary embodiment of the invention.

FIG. 8 is a flowchart illustrating the operation of each component upon changing players.

In the example illustrated in FIG. 8, first, the accepting unit 132 determines whether operation of changing players is performed via the touch panel 120 (Step S101).

When the accepting unit 132 determines that the operation of changing players is performed (Step S101; YES), the accepting unit 132 determines which of the players is selected on the basis of the contact position where the user touches detected by the touch panel 120 (Step S102).

When the accepting unit 132 determines that the player A is selected, the display controller 131 causes the display 110 to display the first screen (Step S103). When the accepting unit 132 determines that the player B is selected, the display controller 131 causes the display 110 to display the second screen (Step S104). When the accepting unit 132 determines that the mixer is selected, the display controller 131 causes the display 110 to display the third screen (Step S105).

When the display controller 131 makes transition in display content on the display 110; the first playback unit 133, the second playback unit 134, and the playback controller 135 retain set values of the playback setting and a set value of the playback control setting that have been set in the first screen, the second screen, and the third screen prior to the transition. Accordingly, the set values are retained before and after the changing of the players even if the user changes players frequently.

As described above, the display controller 131 causes the display 110 to display the first screen, the second screen, and the third screen in such a manner as to make transition between the first screen, the second screen, and the third screen on the basis of the user operation via the touch panel 120. The display controller 131 thus operates as: a first display controller that causes the display 110 to display the first screen; a second display controller that causes the display 110 to display the second screen; a third display controller that causes the display 110 to display the third screen; and a display transition controller that causes the display 110 to display the screens in such a manner as to make transition between the screens.

Accordingly, the user is able to change players sequentially to perform the playback setting and the playback control on the music data to be set, depending on the purpose of the preparation work. For example, a sequential preparation work is easily achievable which includes: performing the preparation work on the music data such as CUE setting by using the player A; performing the compatibility check between the music data of the player A and the music data of the player B by using the mixer; and returning to the player A to perform the adjustment.

In addition, the preparation work using the player A and the player B is separated from the preparation work using the mixer. The player screen includes only operation elements necessary for the preparation work to be performed by the player, and the mixer includes only operation elements necessary for the preparation work to be performed by the mixer. Therefore, even the audio device 100 being the mobile terminal is able to achieve high operability and high visibility in performing the preparation work, without reducing the amount of information to be displayed on the display screen or reducing the size of the object such as the operation element, for example.

It is to be noted that the example described above indicates an example of displaying the mixer screen D3 illustrated in FIG. 2 on the display 110, as an example of the third screen for performing the playback control on the mixer. However, the display controller 131 may perform switching, in response to the user operation, between: a first mode that displays the mixer screen D3 (hereinafter, referred to as "normal mode"); and a second mode that displays an operation element related to playback control in an integrated manner with respect to the first music data of the player A and the second music data of the player B (hereinafter, referred to as "DUAL CONTROL mode").

Figure 9:
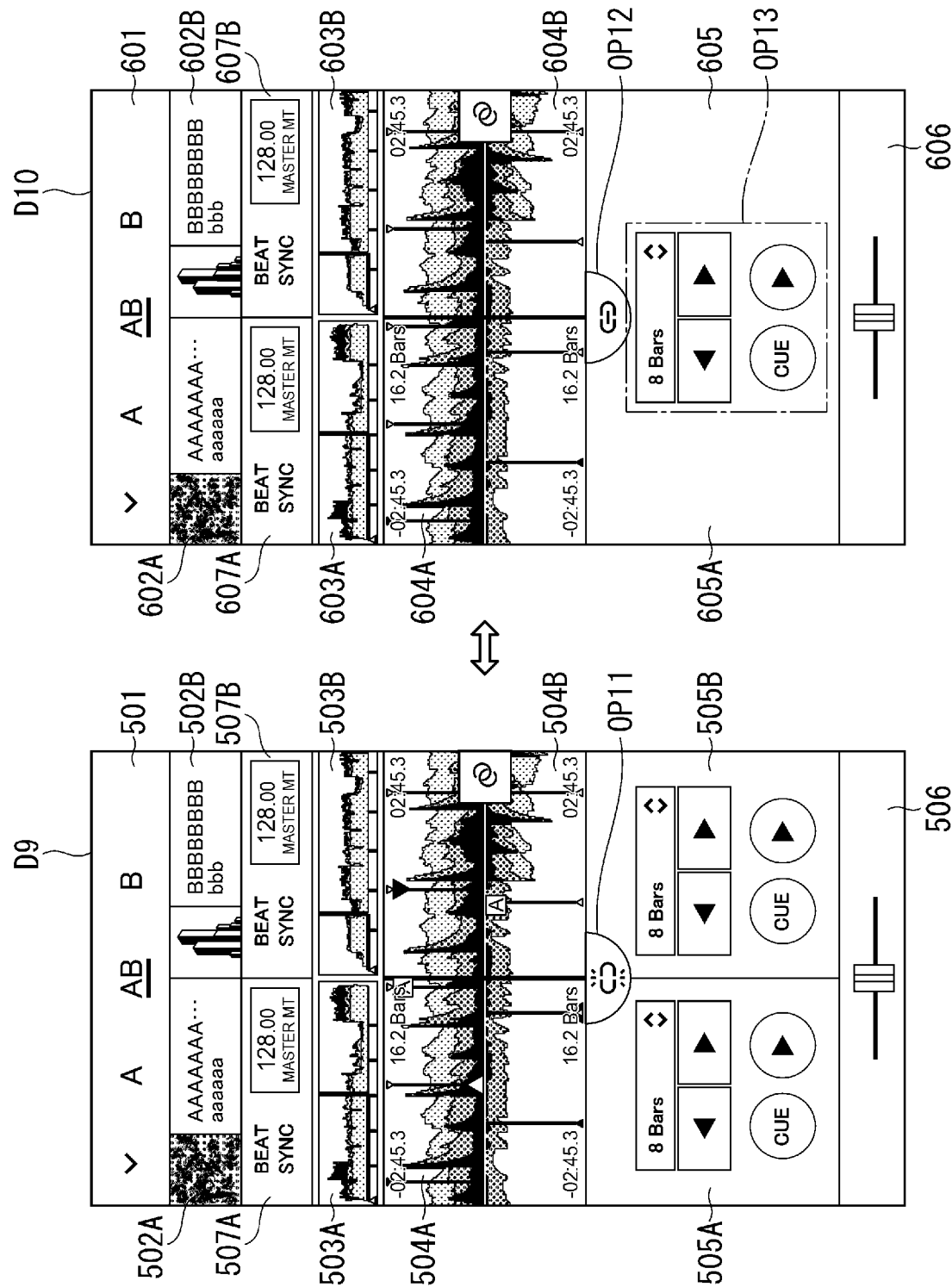
FIG. 9 is a diagram illustrating another example of the display screen according to an exemplary embodiment of the invention.

FIG. 9 illustrates a mixer screen D9 that is the third screen in the normal mode and a mixer screen D10 that is the third screen in the DUAL CONTROL mode. The mixer screen D9 has a configuration substantially the same as the configuration of the mixer screen D3 illustrated in FIG. 2. Of display areas of the mixer screen D9 in the normal mode, display areas except for display areas 505A and 505B are similar to the respective corresponding display areas of the mixer screen D3. The display areas 505A and 505B include an operation element OP11 that includes a DUAL CONTROL button in such a manner as to be overlapped on the display areas 405A and 405B of the mixer screen D3.

When the user operation of selecting the DUAL CONTROL button is performed, the display 110 displays a mixer screen D10 illustrated in FIG. 9. The mixer screen D10 in the DUAL CONTROL mode has a configuration substantially the same as the configuration of the mixer screen D9 illustrated in FIG. 9. Of display areas of the mixer screen D10 in the DUAL CONTROL mode, display areas except for a display area 605 are similar to the respective corresponding display areas of the mixer screen D9. The display area 605 includes: an operation element OP12 including a DUAL CONTROL cancel button; and an operation element OP13 related to the playback control in the integrated manner with respect to the first music data of the player A and the second music data of the player B, as with the display area 505A or 505B of the mixer screen D9.

When the user operation of selecting the DUAL CONTROL cancel button is performed, the display 110 again displays the mixer screen D9 in the normal mode illustrated in FIG. 9.

Figure 10:
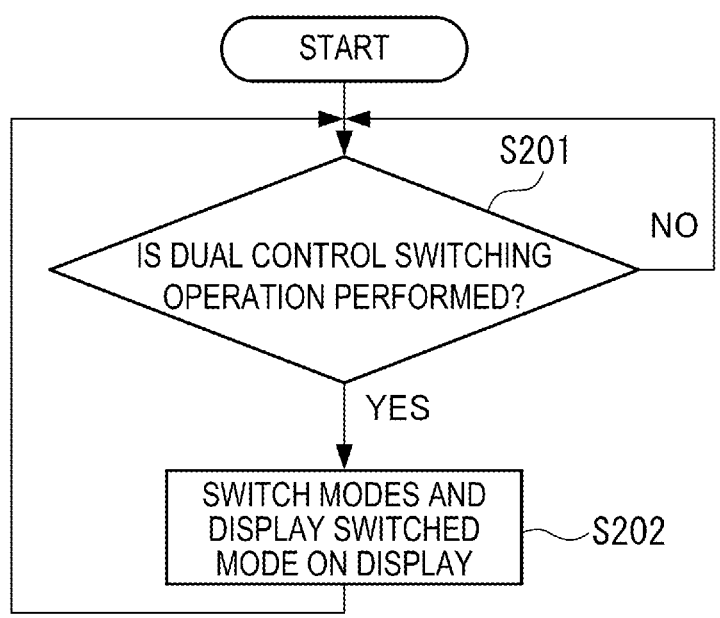
FIG. 10 is another flowchart illustrating the playback control method according to an exemplary embodiment of the invention.

FIG. 10 is a flowchart illustrating operation of each component upon mode switching of the third screen for performing the playback control related to the mixer.

In the example illustrated in FIG. 10, first, the accepting unit 132 determines whether a DUAL CONTROL switching operation is performed via the touch panel 120 (Step S201). As described above, the DUAL CONTROL switching operation is performed by the user selecting the DUAL CONTROL button on the mixer screen D9 or selecting the DUAL CONTROL cancel button on the mixer screen D10.

When the accepting unit 132 determines that the DUAL CONTROL switching operation is performed (Step S201: YES), the display controller 131 switches modes in response to the user operation, and causes the display 110 to display the mixer screen D9 in the normal mode or the mixer screen D10 in the DUAL CONTROL mode (Step S202).

The switching is thus performed on the basis of the user operation, between; the first mode that displays the third operation element including separately the operation element related to the playback control with respect to the first music data and the operation element related to the playback control with respect to the second music data; and the second mode that displays the third operation element including the operation element related to the playback control in the integrated manner with respect to the first music data and the second music data. Accordingly, in the second mode, it is possible to quickly check a result of the mixing of the first music data of the player A and the second music data of the player B. In order to check the mixing, it has been necessary to simultaneously issue playback instructions to the player A and the player B. However, in the DUAL CONTROL mode serving as the second mode, it is possible to check the mixing only by operating the operation element related to the integrated playback control.

In the examples described above, the case of performing the setting related to MEMORY CUE by displaying the player screen D7 illustrated in FIG. 6 on the display 110, and the case of performing the setting related to HOT CUE by displaying the player screen D8 illustrated in FIG. 7 on the display 110 have been described, as examples. However, the setting may be performed by another method.

Hereinafter, a QUICK CUE mode will be described as an example. In the QUICK CUE mode, CUE setting that associates a playback position and a playback action with each other is performed more easily.

Figure 11:
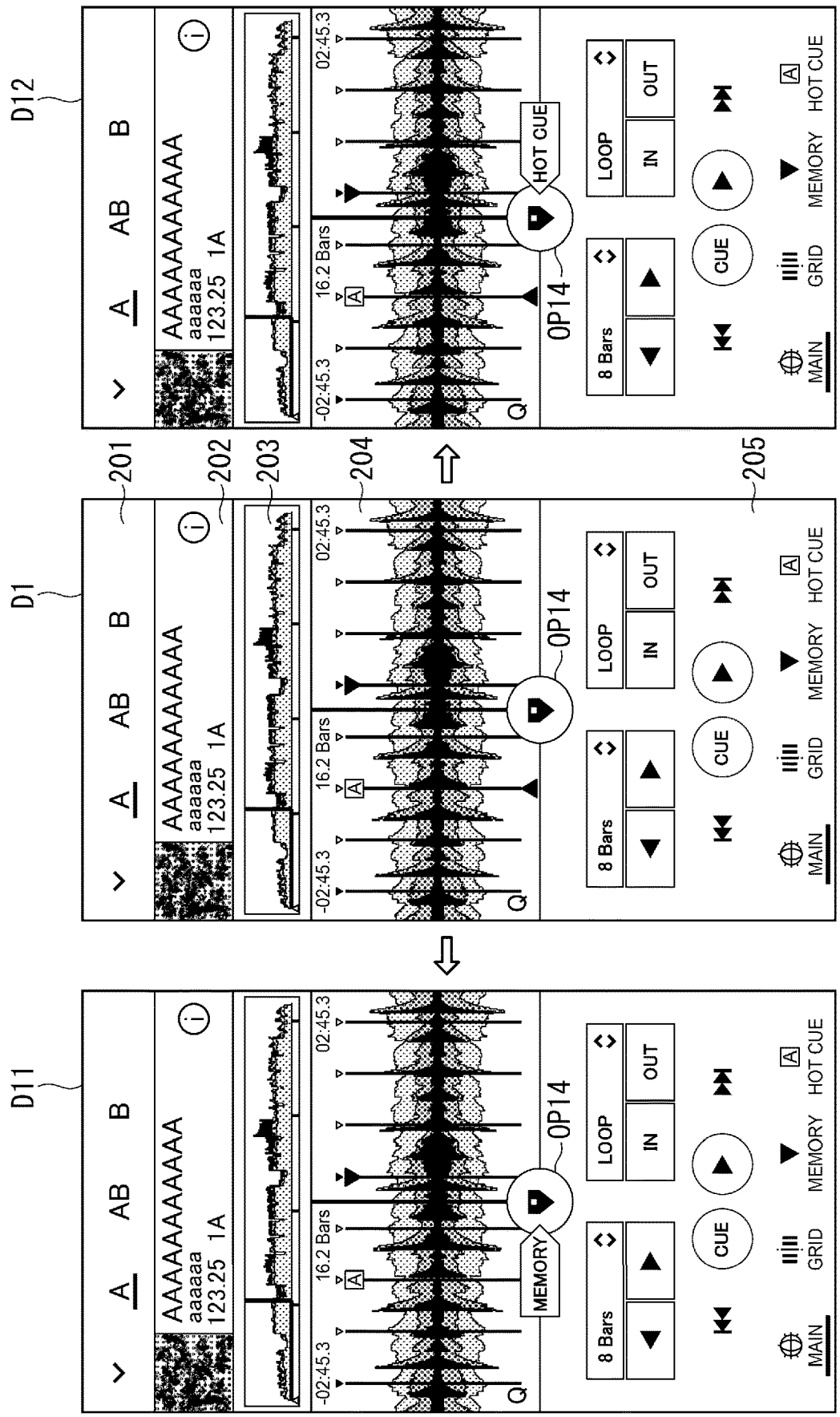
FIG. 11 is a diagram illustrating another example of the display screen according to an exemplary embodiment of the invention.

FIG. 11 illustrates: the player screen D1 described in FIG. 2; a player screen D11 for performing setting related to MEMORY CUE in the QUICK CUE mode; and a player screen D12 for performing setting related to HOT CUE in the QUICK CUE mode.

The player screens D1, D11, and D12 each include an operation element OP14 including a QUICK CUE button at a lower part of the display area 204. The display area 204 displays the partial waveform information of the music data. The QUICK CUE button is disposed near the display area 204, and the user is thus able to perform the operation without removing his/her gaze from the partial waveform information of the music data. Further, disposing the QUICK CUE button at the lower part of the display area 204 makes it possible to avoid an issue that the partial waveform information of the music data is shielded by a finger upon the user operation.

In the QUICK CUE mode, the user is able to easily perform multiple kinds of CUE setting by performing: a tap operation of selecting the QUICK CUE button; or a so-called flick operation of sliding the finger in the horizontal direction from the QUICK CUE button as the start point. More specifically, the playback controller 135 performs setting of CURRENT CUE, that is, CUE setting at the current playback position, in response to the tap operation, performs setting of MEMORY CUE in response to the flick operation in a left direction serving as a first direction, and performs setting of HOT CUE in response to the flick operation in a right direction serving as a second direction which is opposite to the first direction.

Figure 12:
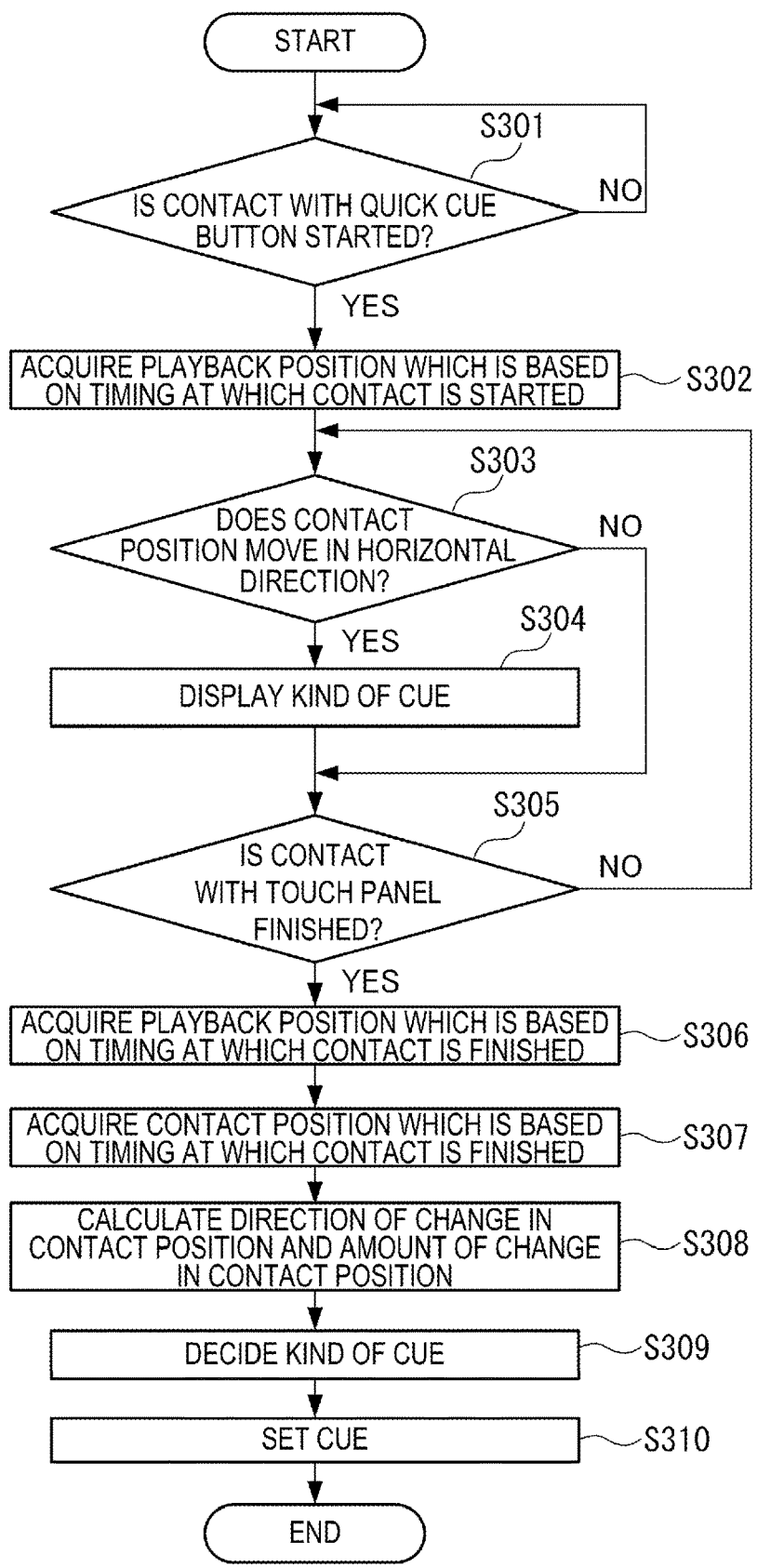
FIG. 12 is another flowchart illustrating the playback control method according to an exemplary embodiment of the invention.

FIG. 12 is a flowchart illustrating operation of each component in the QUICK CUE mode.

In the example illustrated in FIG. 12, first, the accepting unit 132 determines whether contact with the QUICK CUE button is started via the touch panel 120 (Step S301). When the accepting unit 132 determines that the contact with the QUICK CUE button is started (Step S301: YES), the playback controller 135 acquires a playback position which is based on a timing at which the contact is started (Step S302).

Next, the accepting unit 132 determines whether the contact position moves in the horizontal direction via the touch panel 120 (Step S303). The determination of whether the contact position moves may be performed, for example, on the basis of a direction of change in the contact position and a comparison between an amount of the change and a predetermined threshold.

When the accepting unit 132 does not determine that the contact position moves in the horizontal direction after the elapse of a certain period of time (Step S303: NO), the process proceeds to Step S305. When the accepting unit 132 determines that the contact position moves in the horizontal direction (Step S303: YES), the playback controller 135 decides a kind of CUE depending on a direction of the movement, and the display controller 131 displays information indicating the kind of CUE that has been decided on the display 110 (Step S304).

When the accepting unit 132 determines that the contact position moves to the left, the playback controller 135 decides the kind of CUE to be MEMORY CUE, and the display controller 131 displays text information of "MEMORY" on the display 110 as illustrated in the player screen D11 of FIG. 11. Such a display allows the user to confirm that MEMORY CUE is settable.

When the accepting unit 132 determines that the contact position moves to the right, the playback controller 135 decides the kind of CUE to be HOT CUE, and the display controller 131 displays text information of "HOT CUE" on the display 110 as illustrated in the player screen D12 of FIG. 11. Such display allows the user to confirm that HOT CUE is settable.

Next, the accepting unit 132 determines whether the contact with the touch panel 120 is finished (Step S305). When the accepting unit 132 does not determine that the contact with the touch panel 120 is finished after the elapse of a certain period of time (Step S305: NO), the process returns to Step S303. When the accepting unit 132 determines that the contact with the touch panel 120 is finished (Step S305: YES), the playback controller 135 acquires a playback position which is based on a timing at which the contact is finished (Step S306).

Then, the playback controller 135 acquires the contact position on the touch panel 120 which is based on the timing at which the contact is finished (Step S307), and calculates the direction of the change in the contact position and the amount of the change in the contact position (Step S308).

The direction of the change in the contact position and the amount of the change in the contact position are respectively a direction of change in the contact position and an amount of change in the contact position on the touch panel 120 from the timing at which the contact with the QUICK CUE button is started in Step S301 to the timing at which the contact with the touch panel 120 is finished in Step S305. It is possible to calculate the direction of the change in the contact position and the amount of the change in the contact position by determining a difference between coordinate information of the QUICK CUE button on the touch panel 120 and coordinate information of the contact position acquired in Step S307.

The playback controller 135 decides the kind of CUE on the basis of the calculated direction and amount of change (Step S309), and sets CUE (Step S310).

For example, in a case where the contact with the QUICK CUE button is started in Step S301, where the amount of the change in the contact position in the horizontal direction is less than the predetermined threshold and it is therefore determined that the contact position is not moved in Step S303, and where the contact with the touch panel 120 is finished in Step S305, the playback controller 135 determines that the tap operation is performed, and performs setting of CURRENT CUE at the playback position which is based on the timing at which the contact with the touch panel 120 is finished.

Further, for example, in a case where the contact with the QUICK CUE button is started in Step S301, where the amount of the change in the contact position in the left direction is greater than or equal to the predetermined threshold and it is therefore determined that the contact position moves in the left direction in Step S303, and where the contact with the touch panel 120 is finished in Step S305, the playback controller 135 determines that the flick operation in the left direction is performed, and performs setting of MEMORY CUE by associating the playback position which is based on the timing at which the contact with the touch panel 120 is finished with the playback action indicating the playback waiting of the music data at the playback position.

Further, for example, in a case where the contact with the QUICK CUE button is started in Step S301, where the amount of the change in the contact position in the right direction is greater than or equal to the predetermined threshold and it is therefore determined that the contact position moves in the right direction in Step S303, and where the contact with the touch panel 120 is finished in Step S305, the playback controller 135 determines that the flick operation in the right direction is performed, and performs setting of HOT CUE by associating the playback position which is based on the timing at which the contact with the touch panel 120 is finished with the playback action indicating the playback start of the music data from the playback position.

The above-described examples indicate the case where CUE is set at the playback position which is based on the timing at which the contact is finished. However, CUE may be set at the playback position which is based on the timing at which the contact is started, or the playback position at which CUE is to be set may be selectable by the user from: the playback position which is based on the timing at which the contact is started; and the playback position which is based on the timing at which the contact is finished. Alternatively, the setting may be performed only on the basis of the direction of the change.

Further, operation accuracy is sometimes lowered in the QUICK CUE mode. The playback position may thus be struck to the beat position. Moreover, the QUICK CUE mode may also be applied to: the second screen for performing the playback setting and the playback control related to the player B; and the third screen for performing the playback control related to the mixer.

As described above, the kind of the playback setting related to the playback position in the music data, which is based on the timing at which the contact is started or based on the timing at which the contact is finished with the touch panel 120 corresponding to the operation element displayed on the display 110, is decided on the basis of the direction of the change in the contact position on the touch panel 120 from the timing at which the contact is started to the timing at which the contact is finished. This makes it possible to perform multiple kinds of CUE setting by simple operation on the touch panel 120. It has been necessary to call a setting screen for each kind of CUE setting, or to specify a playback position and thereafter associate the playback position with a playback action. However, the QUICK CUE mode makes it possible to perform user's desired CUE setting by intuitive and easy operation.

Further, the playback position in the music data and the playback action are associated with each other in accordance with the above-described direction of the change and the amount of the change in the contact position on the touch panel 120 from the timing at which the contact is started to the timing at which the contact is finished. This makes it possible to perform more detailed setting by a simple operation.

According to an exemplary embodiment of the invention as described above, it is possible for the audio device being a mobile terminal to achieve high operability and visibility in performing a preparation work.

A vertically long display screen assuming a smartphone has had, for example, a layout in which multiple players are displayed in parallel in the vertical direction, and a layout in which the multiple players are displayed in parallel in the horizontal direction, but in consequence, playback directions are displayed vertically. Many of such layouts have given a sense of discomfort to the user. Further, in a case of using a horizontally long display screen, the user has had to re-hold the smartphone or grasp the smartphone with both hands during the use.

According to an exemplary embodiment of the invention, the user is able to perform the preparation work even on the vertically long display screen in a manner similar to a case of performing the preparation work on an actual DJ device. Further, the display screen is vertically long. Thus, the user does not have to re-hold the smartphone during the use, and is able to perform the preparation work in a state of holding the smartphone with one hand.

It is to be noted that each user operation described in the above exemplary embodiment is an example, and is not limited to those in the present exemplary embodiment. For example, instead of the flick operation in the horizontal direction, a flick operation in the vertical direction may be employed. Further, the user operation to be allocated to each of the instructions may be set by the user.

Further, each of the display screens described in the above exemplary embodiment is an example, and elements, designs, arrangement, and the like are not limited to those in the present exemplary embodiment. For example, in addition to the waveform information and the partial waveform information of the entire music data, or in place of the waveform information and the partial waveform information of the entire music data, there may be provided, for example, a record disk, a figure that simulates the record disk, or a jog dial. Further, the elements, the designs, the arrangement, and the like of each display screen may be set by the user.

In addition, each of the operation elements included in each of the display screens according to the exemplary embodiment described above is an example, and kinds, designs, arrangement, and the like of the operation elements are not limited to those in the present exemplary embodiment. Examples of the operation element may include a jog dial, a tempo slider, a performance pad (a versatile operation element to which various functions related to the playback control are allocatable), an operation element related to an effect process on, for example, a phase and a noise, and a channel fader. Further, the kinds, the designs, the arrangement, and the like of the operation elements may be set by the user. However, each of the operation elements is preferably displayed, within the display screen on the display 110, at a position selectable by a thumb of a hand with which the user holds the audio device 100 in a state of holding the audio device 100 with one hand.

Further, in the above exemplary embodiment, the description is given of the audio device 100 including one display 110 as an example; however, the invention may be applied to the audio device 100 including two or more display devices.

In the above exemplary embodiment, the description is given of the audio device being a smartphone as an example of the audio device 100; however, the audio device 100 may be an audio device being a mobile terminal such as a tablet terminal. Further, the invention may be applied to, for example, a player, a mixer that controls a player, a DJ system in which a player and a mixer are integrated, a DJ controller that does not have a playback function, an electronic musical instrument, a karaoke device, and a game console.

Further, in the above exemplary embodiment, the controller 130 of the audio device 100 performs the above-described process by reading and executing a program from an unillustrated storage and an unillustrated recording medium. However, the invention is not limited thereto, and for example, the controller 130 may acquire and execute a program from a device on a network. Examples of the recording medium include a disk-type recording medium, an HDD, and a semiconductor memory.

Preferred exemplary embodiments of the invention have been described above in detail with reference to the accompanying drawings, but the invention is not limited to such exemplary embodiments. It is apparent that a person having ordinary skill in the art of the invention can arrive at various alterations and modifications within the scope of the technical idea recited in the appended claims, and it is understood that such alterations and modifications naturally fall within the technical scope of the invention.

The invention claimed is:

1. An audio device comprising:
a first playback unit configured to play back first music data;
a second playback unit configured to play back second music data; and
a display controller configured to cause a display to display a screen, the screen including an operation element for accepting a user operation related to at least one of playback setting or playback control with respect to at least one of the first music data or the second music data, wherein
the playback setting comprises setting of a playback position in music data to be set,
the display controller comprises:
a first display controller configured to cause the display to display a first screen, the first screen including a first operation element related to the playback setting and the playback control with respect to the first music data;
a second display controller configured to cause the display to display a second screen, the second screen including a second operation element related to the playback setting and the playback control with respect to the second music data;
a third display controller configured to cause the display to display a third screen, the third screen including a third operation element comprising at least one of an operation element related to the playback control with respect to both the first music data and the second music data or an operation element for adjusting an output level ratio between the first music data and the second music data, the third screen not including an operation element related to the playback setting; and
a display transition controller configured to cause the display to display the first screen, the second screen, and the third screen in a manner as to make transition between the first screen, the second screen, and the third screen on a basis of the user operation, and
the audio device is a mobile terminal.

2. The audio device according to claim 1, wherein the third display controller performs switching, on the basis of the user operation, between: a first mode that displays the third operation element including separately the operation element related to the playback control with respect to the first music data and the operation element related to the playback control with respect to the second music data; and a second mode that displays the third operation element including the operation element related to the playback control in an integrated manner with respect to the first music data and the second music data.

3. The audio device according to claim 1, wherein
when the display transition controller makes transition in display content on the display, the first playback unit and the second playback unit each retain a set value of the playback setting and a set value of the playback control setting with respect to the first music data or the second music data that have been set in the first screen, the second screen, or the third screen prior to the transition.

4. The audio device according to claim 1, wherein the playback setting includes setting of specifying a playback position in music data to be set and a playback action to be associated with the playback position.

5. The audio device according to claim 1, wherein
the playback setting includes setting related to beat position information which is to be a reference of a playback position in music data to be set.

6. The audio device according to claim 1, wherein
the playback setting includes setting related to playback repetition of a portion of music data to be set.

7. The audio device according to claim 1, wherein
at least a portion of the operation element is displayed, within a display screen on the display, at a position selectable by a thumb of a hand with which a user holds the mobile terminal in a state of holding the mobile terminal with the hand.

8. A non-transitory computer readable recording medium storing therein a program configured to cause a computer to operate as the audio device according to claim 1.

9. A playback control method to be executed by an audio device, the audio device comprising a first playback unit configured to play back first music data, a second playback unit configured to play back second music data, and a display controller configured to cause a display to display a screen, the screen including an operation element for accepting a user operation related to at least one of playback setting or playback control with respect to at least one of the first music data or the second music data,
the playback setting comprising setting of a playback position in music data to be set, the audio device being a mobile terminal,
the playback control method comprising:
accepting the user operation; and
causing the display to display a first screen, a second screen, and a third screen in a manner as to make transition between the first screen, the second screen, and the third screen on a basis of the user operation, the first screen including a first operation element related to the playback setting and the playback control with respect to the first music data, the second screen including a second operation element related to the playback setting and the playback control with respect to the second music data, the third screen including a third operation element comprising at least one of an operation element related to the playback control with respect to both the first music data and the second music data or an operation element for adjusting an audio output ratio between the first music data and the second music data, the third screen not including an operation element related to the playback setting.

* * * * *